Dec. 27, 1955 H. KIHN 2,728,875

RASTER SIZE CONTROL

Filed Sept. 1, 1953

INVENTOR.

HARRY KIHN

BY [signature]

ATTORNEY 2,728,875
Patented Dec. 27, 1955

2,728,875

RASTER SIZE CONTROL

Harry Kihn, Lawrenceville, N. J., assignor to Radio Corporation of America, a corporation of Delaware Application September 1, 1953, Serial No. 377,841
11 Claims. (Cl. 315—27)

Figure 1:
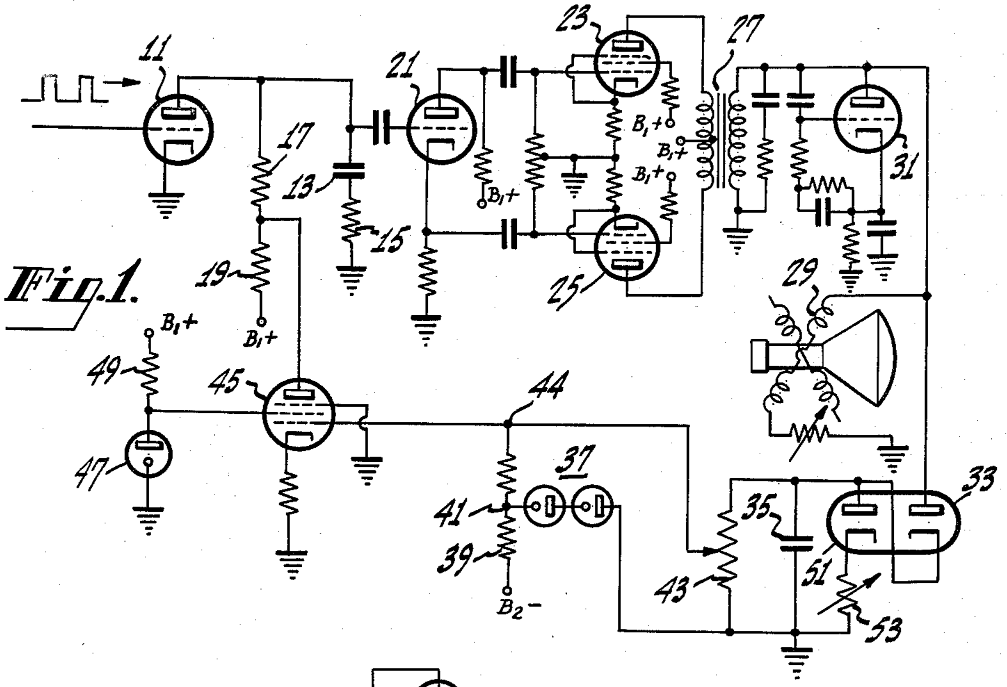

This invention relates to cathode ray deflection systems and more particularly to circuits for maintaining a scanned raster in a cathode ray tube at constant size.

In present practice, a television or radar image is formed in a cathode ray tube by an electron beam which is deflected to scan successive lines of a raster on a fluorescent screen. Deflection of this beam is accomplished by applying a sawtooth deflection wave of current to the windings of a magnetic deflection yoke mounted about the neck of the cathode ray tube. This deflection wave may be generated by a deflection circuit which includes a relaxation oscillator, an amplifier and an output transformer. The relaxation oscillator generates a sawtooth wave voltage by means of a condenser which is charged through a resistance network and then is discharged through an electron tube which is normally cut off but which is driven to conduction by pulses applied to its grid. The sawtooth waves of voltage thus generated may be impressed upon an amplifier of conventional design to produce the sawtooth waves of current needed in the yoke windings for deflection of the electron beam.

The size of the scanned raster is determined by the amplitude of the deflection wave as it appears in the deflection windings. Variations in the output of the deflection circuit may result from variations in the supply voltage, and these variations may appear as changes in the size of the scanned raster. Variations may be objectionable if television or radar equipment is operated from a power source which has poor regulation. If extreme accuracy and stability is desired in the raster size, even normal fluctuations in power supply voltage may cause objectionable fluctuations in the raster.

If the television of radar image is to be optically combined with a predetermined configuration such as on overlay map, extreme accuracy and stability in the size of the scanned raster may be required.

It is an object of this invention, therefore, to provide an improved means for stabilizing the size of the scanned raster, and for compensating for variations which may appear therein.

A further object is to provide an improved means for regulating the output of a deflection circuit to maintain the deflection wave amplitude at substantially a constant level.

A further object is to provide a means for sampling the voltage appearing across the deflection yoke; the sampling means being in itself stable regardless of variations in the voltage of the power source.

According to this invention the peak voltage of the deflection wave, as it is impressed upon the yoke, is sampled by a circuit employing a first diode and a resistive-capacitive load. This sampled voltage is compared to a standard voltage developed across gas discharge tubes, and the difference voltage thus obtained is used to control the deflection wave generating means.

To compensate for changes in the conductance characteristics of the first diode and to thereby maintain an accurate and stable voltage sampling circuit; a second diode, enclosed in the same envelope and sharing the same heating element, is connected with a resistor to shunt the resistive-capacitive load of the first diode.

Figure 2:
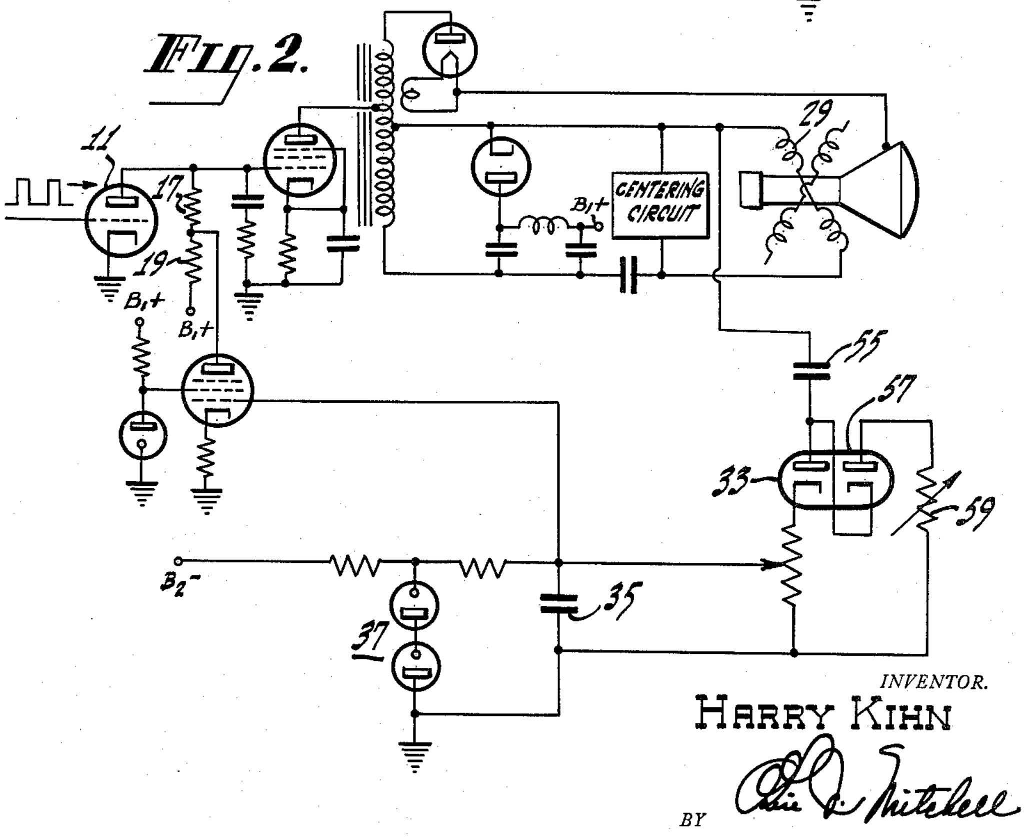

Other objects of this invention will become apparent upon a reading of the following specification and an inspection of the accompanying drawing in which:

Figure 1 is a circuit diagram of a deflection circuit for a television or radar system employing this invention; and Figure 2 shows an alternate form of this invention for a deflection circuit which employs direct current in the deflection yoke to achieve raster centering.

Referring again but in more detail to Figure 1, there is shown a deflection circuit which may be used in a radar system. Synchronizing pulses are applied to the grid of a discharge tube 11 and a sawtooth wave is developed at the plate of this tube resulting from the charge on condenser 13 which builds up gradually by current which flows through resistors 15, 17 and 19, and which is discharged abruptly through the tube 11. The sawtooth wave is impressed on an amplifying circuit of conventional design which includes the electron tubes 21, 23 and 25. This circuit is capacitively coupled to the sawtooth wave generating circuit of discharge tube 11 and its output is applied to transformer 27. The output consists of a sawtooth deflection wave of current which is directly impressed upon the windings of the deflection yoke 29. A grid control damper tube 31 damps the oscillations which would appear cross the deflection yoke windings and across the windings of the output transformer.

The deflection wave as it is applied to the yoke is sampled by a diode 33 which conducts when the deflection wave is near its peak and charges a condenser 35 to a voltage corresponding to the amplitude of the deflection waves. A second circuit is coupled from an independent power source $B_2$ to ground through a pair of gas discharge tubes 37 and a resistor 39. The power source $B_2$ (not shown) is grounded at its positive terminal and thereby furnishes a negative potential to the circuit as indicated. The voltage at the connecting point 41 between the gas discharge tubes and the resistor remains constant because of the inherent characteristics of these constant voltage tubes. Any variation in the value of the $B_2$ voltage appears entirely across resistor 39. A potential dividing resistor 43 is used to combine a portion of the voltage across condenser 35 and the standard voltage of point 41. The combined voltage appears as a difference voltage at point 44. This difference voltage is amplified by a pentode amplifier 45 and becomes a control voltage to be applied to the circuit of the discharge tube 11.

The screen grid of pentode 45 is held at a constant potential above ground regardless of the fluctuations in the power supply $B_1$, since a gas discharge tube 47 maintains a constant voltage drop in a circuit from the source $B_1$ through a resistance 49 to ground. In this form of the invention the control voltage is impressed at the series connecting point between resistors 17 and 19 to vary the effective plate voltage of the discharge tube 11. Variations in the output of the deflection circuit which may appear are minimized by the action of the sampling circuit which is used to control the discharge tube of the deflection circuit. To insure accurate sampling by diode 33 a second diode 51 tends to discharge condenser 35 through a resistance 53. Variations in the heater temperature or emission characteristics of diode 33 are compensated for by similar variations in diode 51. Since both diodes utilize the same heater and are in the same tube envelope an error resulting from changing the emission characteristics will be reflected in both circuits in opposite polarity. This stabilizes the sampling circuit and compensates for variations which may appear.

Figure 2 shows a conventional television deflection circuit incorporating the invention. The deflection circuit uses direct current in the deflection windings 29 for centering the scanned raster and a blocking condenser 55 serves to couple the sampling circuit to the deflection yoke and prevents direct current from flowing to the diode 33. Although the condenser 55 serves the useful purpose of isolating the sampling circuit from centering current that may be flowing in the yoke, it also cuts off the normal path for the flow of plate current from the diode 33. Therefore, the second pair of electrodes 57 is connected as a path to the positive potential $B_2$ through a variable resistance 59. In this form of the invention, the blocking condenser 55 is charged by a deflection wave which is sampled by the diode 33. This condenser 55 will subsequently lose its charge via a path to ground through the diode 57. The sampled voltage of diode 33 appears across the condenser 35 and is composed to the standard voltage developed across the gas tubes 37 in the same manner as described in connection with Figure 1. The difference voltage thus obtained is amplified and used to control the deflection wave generator by varying the effective potential between resistors 17 and 19 in the plate circuit of the discharge tube 11.

In another form of this invention the control voltage obtained from the sampling circuit and the standard voltage circuit may be applied to a control electrode of an amplifier tube in the amplifying circuit. The use of a negative polarity pulse with a positive polarity standard will eliminate the need for a separate direct current power supply.

What is claimed is:

1. A system for deflecting an electron beam in a cathode ray tube, said system comprising a deflection wave generator, a deflection yoke winding coupled to said deflection wave generator, a first unidirectional conducting device, a capacitor connected to said first unidirectional conducting device, at least one constant voltage discharge device, a circuit coupled between said capacitor and said first constant voltage discharge device, said circuit being operative to produce a control voltage which is representative of the difference between the voltage sampled across said deflection yoke and the constant voltage of said discharge tube, an amplifying circuit coupled between the circuit for producing said control voltage and said deflection wave generator, a second unidirectional conducting device coupled to said first unidirectional conducting device, and a resistor coupled between said second unidirectional conducting device and said capacitor whereby said second unidirectional conducting device and said resistor serve as a discharge path for said capacitor.

2. A control circuit for an electron beam deflection system having a deflection wave generator and a deflection yoke winding, said control circuit comprising a diode for sampling voltage appearing across said deflection yoke winding, a capacitor connected to said diode for storing said sampled voltage, at least one gas discharge device for obtaining a standard voltage, and a voltage combining circuit coupled between said capacitor and said gas discharge device, said voltage combining circuit being operative to produce a control voltage which is representative of the difference between said sampled voltage and said standard voltage, said deflection wave generator being coupled to said voltage combining circuit.

3. A control circuit for an electron beam deflection system having a deflection wave generator and a deflection yoke winding, said control circuit comprising a first diode for sampling voltage appearing across said deflection yoke winding, a capacitor connected to said first diode for storing said sampled voltage, at least one constant potential discharge device for obtaining a standard voltage, a voltage combining network coupled between said capacitor and said constant potential discharge device, said voltage combining network being operative to produce a control voltage which is representative of the difference between said sampled voltage and said standard voltage, said deflection wave generator being coupled to said voltage combining circuit, a second diode coupled to said first diode and an adjustable impedance device connected between said second diode and said capacitor, said second diode and said adjustable impedance being operative to discharge said capacitor whereby the fluctuations in the sampling of voltage by said first diode are compensated for by similar fluctuations in the discharge of said capacitor by said second diode.

4. A system for deflecting an electron beam to scan a raster in a cathode ray tube comprising a deflection wave generator, a deflection yoke winding coupled to said deflection wave generator, an adjustable source of direct current for providing a centering adjustment for said raster, said source of direct current being coupled to said deflection yoke winding, a first unidirectional conduction device coupled to said deflection yoke winding, said first unidirectional conduction device being operative to sample voltage across said deflection yoke winding, a capacitor coupled to said first unidirectional conduction device for storing the voltage sampled from said deflection yoke winding, at least one constant potential discharge device for obtaining a standard voltage, a voltage combining circuit coupled between said capacitor and said constant potential discharge device, said voltage combining circuit being operative to produce a control voltage which is representative of the difference between said sampled voltage and said standard voltage, said deflection wave generator being coupled to said voltage combining circuit, a second unidirectional conducting device coupled to said first unidirectional conducting device, and an adjustable resistor coupled between said second unidirectional conducting device and said capacitor, said second unidirectional conducting device being operative to provide a path for the flow of direct current from said first unidirectional conducting device.

5. A circuit arrangement for maintaining the deflection of an electron beam in a cathode ray tube between limits, including a deflection wave generator, an electron beam deflecting winding coupled to said deflection wave generator, means coupled across said deflecting winding to store a charge proportional to the amplitude of the applied deflection wave, means to provide a constant potential, means to compare said stored charge with said constant potential and control means having an output circuit shunted across said deflection wave generator to load the same and having input connected to said comparing means to vary the load on said generator in proportion to the charge in said charge storing means whereby the amplitude of said deflection wave is rendered substantially constant.

6. A circuit arrangement for maintaining the deflection of an electron beam in a cathode ray tube between limits, including a deflection wave generator, an electron beam deflecting winding coupled to said deflection wave generator, means coupled across said deflecting winding to store a charge proportional to the amplitude of the applied deflection wave, means to provide a constant potential, means to combine the stored charge with said constant potential to produce a control potential equal to the difference between said charge and said potential, and control means connected to said deflection wave generator to load the same and responsive to said control potential to vary the load on said generator in proportion to the charge in said charge storing means whereby the amplitude of said deflection wave is rendered substantially constant.

7. A circuit arrangement for maintaining the deflection of an electron beam in a cathode ray tube between limits, including a deflection wave generator, an electron beam deflecting winding coupled to said deflection wave generator, unidirectional conducting device and a storage device effectively connected in series across said deflecting winding to store a charge proportional to the amplitude of the applied deflection wave, a constant potential device and a resistive element connected in series across said capacitor, a resistor and a source of energizing potential connected in series across said constant potential device to maintain a constant potential thereacross, a control device having an output circuit shunted across said deflection wave generator to load the same and having input circuit connected to said charge storing device to vary the load on said generator proportional to the charge in said charge storing device whereby the amplitude of said deflection wave is rendered substantially constant.

8. A circuit arrangement for deflecting an electron beam in a cathode ray tube, including a deflection wave generator having an electron discharge device therein, an electron beam deflecting winding coupled to said deflection wave generator, a diode and a capacitor effectively connected in series across said deflecting winding, a gaseous discharge device and a resistance element connected in series across said capacitor, a resistor and a source of energizing potential connected in series across said gaseous discharge device, and a control electron discharge device having an anode-cathode circuit shunted across the electron discharge device of said deflection wave generator and having a grid circuit connected to said capacitor.

9. A circuit arrangement for deflecting an electron beam in a cathode ray tube, including a deflection wave generator having an electron discharge device therein, an electron beam deflecting winding coupled to said deflection wave generator, a diode and a capacitor effectively connected in series across said deflecting winding, a gaseous discharge device and a resistance element connected in series across said capacitor, a resistor and a source of energizing potential connected in series across said gaseous discharge device, and a control electron discharge device having an anode-cathode circuit shunted across the electron discharge device of said deflection wave generator and having a grid circuit connected to said capacitor and a further diode and an adjustable resistance element shunted across said capacitor.

10. A circuit arrangement for deflecting an electron beam in a cathode ray tube between limits, including a deflection wave generator having an electron discharge device therein, an electron beam deflecting winding coupled to said deflection wave generator, a capacitor, a diode and a resistance element effectively connected in series across said deflecting winding, a storage capacitor shunted across at least a part of said resistance element, a gaseous discharge device and a resistor connected in series across said capacitor, another resistor and a source of energizing potential connected in series across said gaseous discharge device, a control electron discharge device having an anode-cathode circuit shunted across the discharge device in said deflection wave generator and having a grid circuit connected to said storage capacitor.

11. A circuit arrangement for deflecting an electron beam in a cathode ray tube between limits, including a deflection wave generator having an electron discharge device therein, an electron beam deflecting winding coupled to said deflection wave generator, a capacitor, a diode and a resistance element effectively connected in series across said deflecting winding, a storage capacitor shunted across at least a part of said resistance element, a gaseous discharge device and a resistor connected in series across said capacitor, another resistor and a source of energizing potential connected in series across said gaseous discharge device, a control electron discharge device having an anode-cathode circuit shunted across the discharge device in said deflection wave generator and having a grid circuit connected to said storage capacitor, and a further diode and an adjustable resistance element shunted across said resistance element and the first said diode.

References Cited in the file of this patent

UNITED STATES PATENTS

| | | |
|---|---|---|
| 2,118,977 | Lewis et al. | May 31, 1938 |
| 2,230,819 | White | Feb. 4, 1941 |
| 2,369,631 | Zanarini | Feb. 13, 1945 |
| 2,466,537 | De Vore | Apr. 5, 1949 |
| 2,601,153 | Knight | June 17, 1952 |
| 2,654,855 | Denton | Oct. 6, 1953 |
| 2,657,332 | Lockhart | Oct. 27, 1953 |
| 2,658,163 | DeCola | Nov. 3, 1953 |
| 2,695,975 | Sanford | Nov. 30, 1954 |
| 2,697,798 | Schlesinger | Dec. 21, 1954 |